US010355613B2

(12) United States Patent
Oki et al.

(10) Patent No.: US 10,355,613 B2
(45) Date of Patent: Jul. 16, 2019

(54) SWITCH DRIVING CIRCUIT AND SWITCHING POWER DEVICE USING THE SAME

(71) Applicant: Rohm Co., Ltd., Kyoto (JP)

(72) Inventors: Hirokazu Oki, Kyoto (JP); Kiyoaki Hoshino, Kyoto (JP); Seiichiro Kondo, Kyoto (JP); Yuichi Kokusho, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 93 days.

(21) Appl. No.: 14/883,744

(22) Filed: Oct. 15, 2015

(65) Prior Publication Data

US 2016/0111964 A1 Apr. 21, 2016

(30) Foreign Application Priority Data

Oct. 17, 2014 (JP) ................................ 2014-212705

(51) Int. Cl.
*H02M 3/335* (2006.01)
*H02M 3/337* (2006.01)
*H02M 1/00* (2006.01)
*H02M 1/38* (2007.01)

(52) U.S. Cl.
CPC ............ *H02M 3/3378* (2013.01); *H02M 1/38* (2013.01); *H02M 2001/0054* (2013.01); *H02M 2001/0058* (2013.01); *Y02B 70/1491* (2013.01)

(58) Field of Classification Search
CPC .................. H02M 3/338; H02M 1/38; H02M 2001/0054; H02M 2001/0058; H02M 3/3378; H02M 3/335; H02M 1/0054; H02M 3/33569; H02M 3/33584; H02M 3/33507; H02M 3/337; H02M 3/3376; Y02B 70/1491
USPC ......................................... 363/17
See application file for complete search history.

(56) References Cited

U.S. PATENT DOCUMENTS

| 6,466,458 | B2 * | 10/2002 | Zhang | H02M 3/3372 363/132 |
| 8,488,346 | B2 * | 7/2013 | Usami | H02M 7/217 363/21.06 |
| 2004/0022075 | A1 * | 2/2004 | Perry | H02M 3/33592 363/21.01 |
| 2010/0220500 | A1 * | 9/2010 | Mino | H02M 1/32 363/17 |
| 2010/0232180 | A1 * | 9/2010 | Sase | H02M 3/33576 363/17 |
| 2011/0051465 | A1 * | 3/2011 | Usui | H02M 3/337 363/21.02 |

(Continued)

OTHER PUBLICATIONS

Design and Trial Production of Phase Shift Full-Bridge ZVS power source (with English translation).

*Primary Examiner* — Jue Zhang
*Assistant Examiner* — Lorena D Bruner
(74) *Attorney, Agent, or Firm* — Fish & Richardson P.C.

(57) ABSTRACT

A switch driving circuit is provided, wherein the switch driving circuit has a function of periodically updating a simultaneous OFF time prepared to soft-switch an upper switch and a lower switch of a switching output circuit, and is configured to monitor how an output power or an input power of the switching output circuit is changed depending on previous updating of the simultaneous OFF time to determine new updated contents.

22 Claims, 9 Drawing Sheets

(56) References Cited

U.S. PATENT DOCUMENTS

| | | | | |
|---|---|---|---|---|
| 2011/0188275 A1* | 8/2011 | Mino | ............... | H02M 1/36 |
| | | | | 363/49 |
| 2011/0194206 A1* | 8/2011 | Sase | ............... | H02M 3/33592 |
| | | | | 363/17 |
| 2014/0140106 A1* | 5/2014 | Duan | ............... | H02M 3/33592 |
| | | | | 363/21.06 |
| 2015/0249345 A1* | 9/2015 | Kashiwagi | ............... | H02J 5/005 |
| | | | | 307/104 |
| 2016/0043648 A1* | 2/2016 | Usami | ............... | H02M 1/12 |
| | | | | 363/21.12 |

\* cited by examiner

SWITCH DRIVING CIRCUIT AND SWITCHING POWER DEVICE USING THE SAME

CROSS-REFERENCE TO RELATED APPLICATION

This application is based upon and claims the benefit of priority from Japanese Patent Application No. 2014-212705, filed on Oct. 17, 2014, the entire contents of which are incorporated herein by reference.

TECHNICAL FIELD

The present disclosure relates to a switch driving circuit and a switching power device using the same.

BACKGROUND

A phase shift full-bridge zero-volt switching (ZVS) operation has been proposed as an effective scheme for supporting mutual compatibility between enhancement of efficiency of a switching power device and noise reduction, compared with the related arts.

In the switching power device of the related art, a simultaneous OFF time (also known as a dead time) of an upper switch and a lower switch is set to be long in order not to interrupt the soft switching operation (ZVS operation) even when a load is light or a device delay is great.

However, when the long simultaneous OFF time is fixedly set, a high enough efficiency may not be achieved when a load is heavy or a device delay is small.

In addition, an optimal value of the simultaneous OFF time for achieving the highest efficiency is significantly changed by manufacturing deviations of upper and lower switches, transformers, or the like, and is also significantly changed by the magnitude of current flowing in such components.

SUMMARY

The present disclosure provides some embodiments of a switch driving circuit capable of always performing an optimal soft switching operation (ZVS operation) in consideration of the foregoing problems discovered by the inventors of the present application, and a switching power device using the same.

According to one embodiment of the present disclosure, there is provided a switch driving circuit, wherein the switch driving circuit has a function of periodically updating a simultaneous OFF time prepared to soft-switch an upper switch and a lower switch of a switching output circuit, and is configured to monitor how an output power or an input power of the switching output circuit is changed depending on previous updating of the simultaneous OFF time to determine new updated contents (hereinafter, referred to as the "first feature").

Further, in the switch driving circuit having the first configuration, in a case in which the output power is increased or the input power is decreased depending on previous updating of the simultaneous OFF time, the simultaneous OFF time may be changed in a direction of a change that is the same as that of the previous updating, and in a case in which the output power is decreased or the input power is increased depending on previous updating of the simultaneous OFF time, the simultaneous OFF time may be changed in a direction of a change that is opposite to that of the previous updating (hereinafter, referred to as the "second feature").

Also, in the switch driving circuit having the first or second configuration, the switch driving circuit may be configured to monitor at least one of an output current, an output voltage, an input current, and an input voltage of the switching output circuit (hereinafter, referred to as the "third feature").

In addition, the switching power device disclosed herein includes the switch driving circuit having any one of the first to third configurations; and a switching output circuit configured to generate an output voltage from an input voltage depending on ON/OFF control of the upper switch and the lower switch (hereinafter, referred to as the "fourth feature").

Further, in the switching power device having the forth configuration, the switching output circuit may include: a transformer including electronically coupled primary winding and secondary winding; a first upper switch and a first lower switch connected in series between an application terminal of the input voltage and a first ground terminal and in which a connection node therebetween is connected to a first terminal of the primary winding through an inductor; a first upper switch and a first lower switch connected in series between the application terminal of the input voltage and the first ground terminal and in which a connection node therebetween is connected to a second terminal of the primary winding; and a rectifying part configured to generate the output voltage from an inductive voltage that appears in the secondary winding (hereinafter, referred to as the "fifth feature").

Also, in the switching power device having the fifth configuration, the rectifying part may include: a first rectifying diode, in which a cathode is connected to a first terminal of the secondary winding and an anode is connected to a second ground terminal; a second rectifying diode, in which a cathode is connected to a second terminal of the secondary winding and an anode is connected to the second ground terminal; a choke coil, in which a first terminal is connected to an intermediate tap of the second winding and a second terminal is connected to an application terminal of the output voltage; a smoothing capacitor, in which a first terminal is connected to the application terminal of the output voltage and a second terminal is connected to the second ground terminal (hereinafter, referred to as the "sixth feature").

Also, in the switching power device having the fifth or sixth configuration, the switch driving circuit may be configured to periodically update a first simultaneous OFF time prepared to soft-switch the first upper switch and the first lower switch and a second simultaneous OFF time prepared to soft-switch the second upper switch and the second lower switch (hereinafter, referred to as the "seventh feature").

Also, in the switching power device having the seventh configuration, the switch driving circuit may be configured to set the first simultaneous OFF time and the second simultaneous OFF time to have different lengths (hereinafter, referred to as the "eighth feature").

Also, in the switching power device having the eighth configuration, the switch driving circuit may be configured to update the first simultaneous OFF time and the second simultaneous OFF time at different timings (hereinafter, referred to as the "ninth feature").

Also, in the switching power device having the ninth configuration, the switch driving circuit may be configured to continuously update the first simultaneous OFF time and the second simultaneous OFF time at a plurality of periods (hereinafter, referred to as the "tenth feature").

DETAILED DESCRIPTION

<Switching Power Device>

Figure 1:
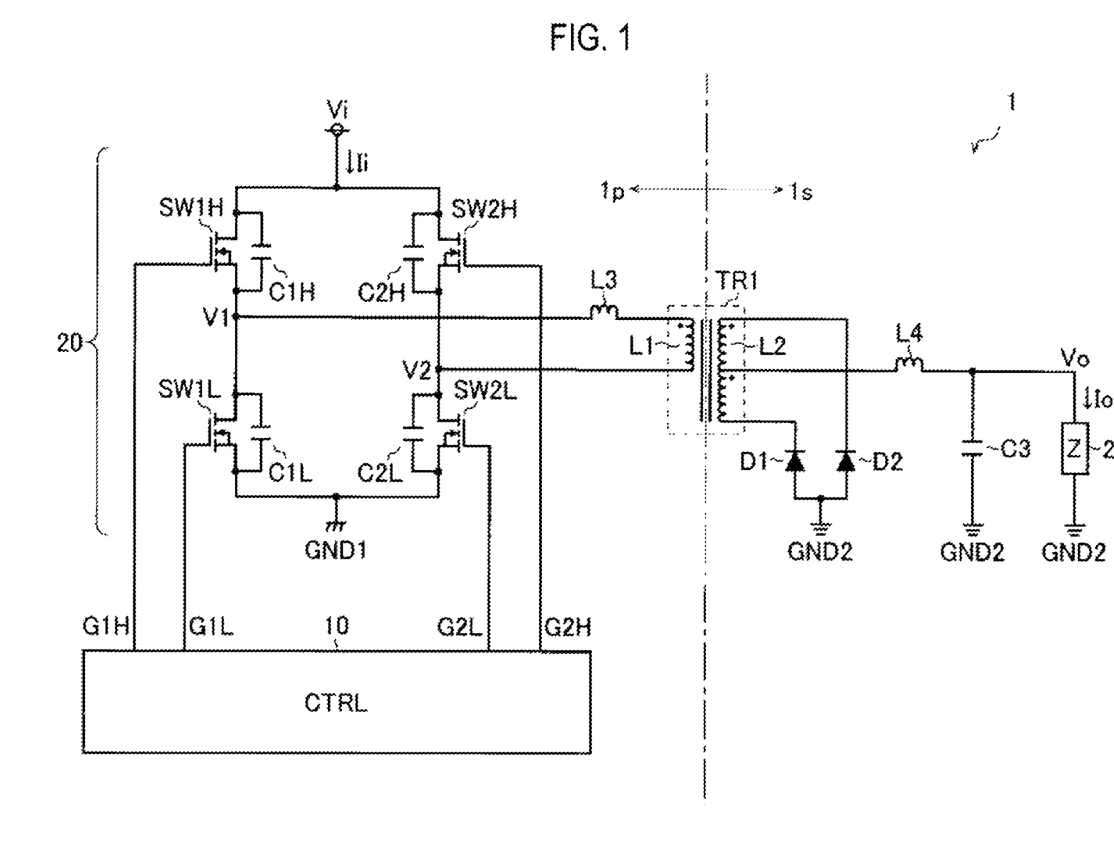
FIG. 1 is a circuit diagram illustrating a configuration example of a switching power device 1.

FIG. 1 is a circuit diagram illustrating a configuration example of a switching power device 1. The switching power device 1 of this exemplary configuration is an insulating DC/DC converter for generating a desired output voltage Vo from an input voltage Vi and supplying the generated voltage Vo to a load 2, and includes a switch driving circuit 10 and a switching output circuit 20.

The switch driving circuit 10 pulse-drives each of gate signals G1H and G1L and gate signals G2H and G2L such that the output voltage Vo is equal to a target value, thereby driving the switching output circuit 20 (more specifically, the upper switches SW1H and SW2H and the lower switches SW1L and SW2L). A configuration and an operation of the switch driving circuit 10 will be described in detail later.

The switching output circuit 20 includes a transformer TR1, the upper switches SW1H and SW2H, the lower switches SW1L and SW2L, an inductor L3, a choke coil L4, rectifying diodes D1 and D2, and a smoothing capacitor C3, and generates the output voltage Vo from the input voltage Vi depending on the ON/OFF control of the upper switches SW1H and SW2H, and the lower switches SW1L and SW2L.

The transformer TR1 includes electronically coupled primary winding L1 and secondary winding L2, and transfers an alternating current (AC) power from a primary circuit system 1p (GND1 system) to a secondary circuit system is (GND2 system), while electrically insulating the primary circuit system 1p and the secondary circuit system 1s.

The upper switch SW1H and the lower switch SW1L, which are first arms of a full-bridge type output stage, are connected in series between an application terminal of the input voltage Vin and an application terminal (which corresponds to a first ground terminal) of a ground voltage GND1. A connection node (i.e., an application terminal of a node voltage V1) between the upper switch SW1H and the lower switch SW1L is connected to a first terminal of the primary winding L1 through the inductor L3. As the inductor L3, the leakage inductance of the transformer TR1 may be appropriately used. Parasitic capacitors C1H and C1L are positioned between both ends of the upper switch SW1H and the lower switch SW1L, respectively.

The upper switch SW2H and the lower switch SW2L, which are second arms of the full-bridge type output stage, are connected in series between the application terminal of the input voltage Vin and the application terminal of the ground voltage GND1. A connection node (i.e., an application terminal of a node voltage V2) between the upper switch SW2H and the lower switch SW2L is connected to a second terminal of the primary winding L1. Parasitic capacitors C2H and C2L are positioned between both ends of the upper switch SW2H and the lower switch SW2L, respectively.

In addition, in a case in which a high voltage is applied to the upper switches SW1H and SW2H and the lower switches SW1L and SW2L, high voltage switch devices such as a power metal-oxide-semiconductor field effect transistor (MOSFET), an insulated gate bipolar transistor (IGBT), and an SiC transistor are used as switch devices.

A cathode of the rectifying diode D1 is connected to the first terminal of the secondary winding L2. A cathode of the rectifying diode D2 is connected to a second terminal of the secondary winding L2. Both anodes of the rectifying diodes D1 and D2 are connected to an application terminal (which corresponds to a second ground terminal) of a ground voltage GND2. A first terminal of the choke coil L4 is connected to an intermediate tap of the secondary winding L2. Both a second terminal of the choke coil L4 and a first terminal of the smoothing capacitor C3 are connected to an application terminal of the output voltage Vo. A second terminal of the smoothing capacitor C3 is connected to an application terminal of the ground voltage GND2.

The rectifying diodes D1 and D2, the choke coil L4, and the smoothing capacitor C3 connected in this manner serve as a full-wave rectifying type rectifying/smoothing part for generating the output voltage Vo from an inductive voltage that appears in the secondary winding L2. However, the configuration of the rectifying/smoothing part is not necessarily limited thereto, and for example, a half-wave rectifying type may also be employed.

The upper switch SW1H and the lower switch SW1L are complementarily turned on and off depending on the gate signals G1H and G1L, respectively. Also, the upper switch SW2H and the lower switch SW2L are complementarily turned on and off depending on the gate signals G2H and G2L, respectively. In this present disclosure, the term "complementary" includes a case in which a predetermined delay is given to a transition timing of ON/OFF of the upper switch and the lower switch (a simultaneous OFF time Td (dead time) of the upper switch and the lower switch is provided), as well as including a case in which an ON/OFF state of the upper switch and the lower switch are completely reversed.

Further, the simultaneous OFF time Td of the upper switch and the lower switch is provided to prevent an excessive through current flowing through the two switches, implement a soft switching operation (ZVS operation), and reduce switching loss and switching noise.

<Soft Switching Operation>

Figure 2:
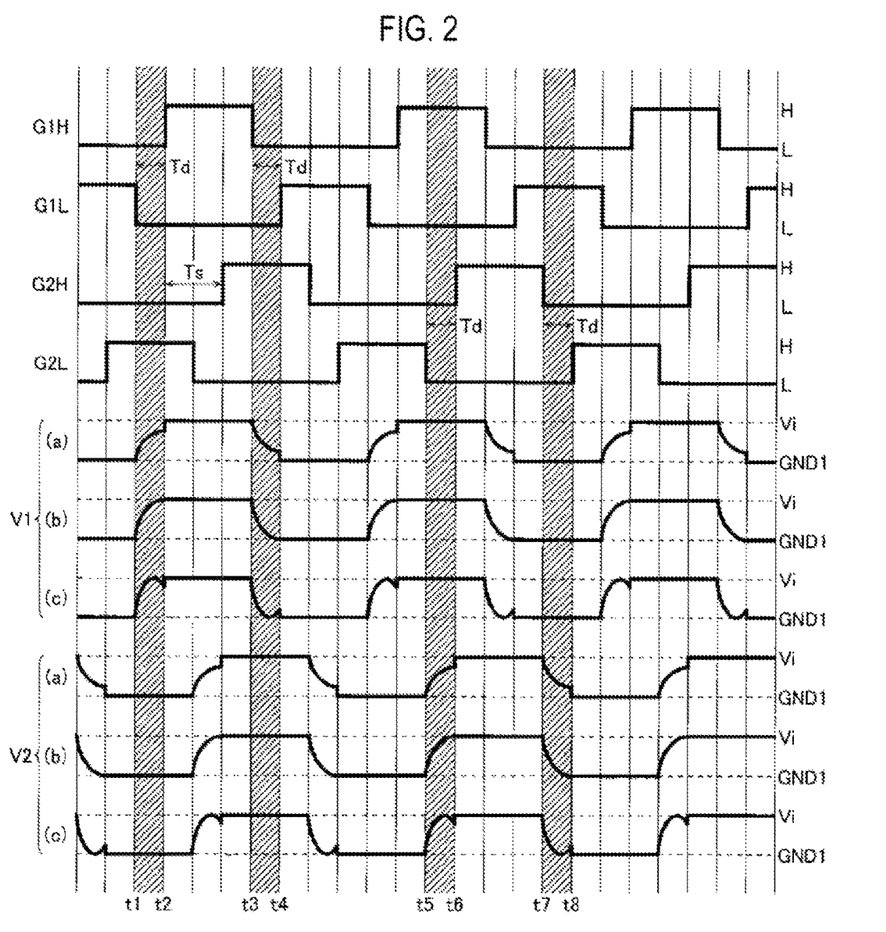
FIG. 2 is a timing chart illustrating an example of a soft switching operation.

FIG. 2 is a timing chart illustrating an example of a soft switching operation (phase shift full-bridge ZVS operation) by the switch driving circuit 10, and the gate signals G1H, G1L, G2H, and G2L, and the node voltages V1 and V2 are illustrated sequentially from top to bottom of the figure. Further, as for the node voltages V1 and V2, behaviors thereof (a) in a case in which the simultaneous OFF time Td is smaller than an optimal value, (b) in a case in which the simultaneous OFF time Td is identical to the optimal value, and (c) in a case in which the simultaneous OFF time Td is greater than an optimal value are illustrated.

First, before describing the soft switching operation (ZVS operation), a basic operation of phase shift full-bridge pulse width modulation (PWM) control will be briefly described. In the phase shift full-bridge PWM control, the gate signals G1H, G1L, G2H, and G2L are pulse-driven at a predetermined duty rate (for example, at 50%). Further, a shift time Ts (phase difference) is set between the gate signals G1H and G1L of the first arm side and the gate signals G2H and G2L of the second arm side. By variably controlling the shift time Ts, an application time (duty) of the input voltage Vi with respect to the primary winding L1 is changed. Thus, in the phase shift full-bridge PWM control, a feedback control of the output voltage Vo may be performed, while uniformly fixing a switching frequency, unlike an LLC resonance control of a half-bridge configuration.

Next, a soft switching operation (ZVS operation) of the upper switches SW1H and SW2H and the lower switches SW1L and SW2L will be described.

For example, as illustrated in the time duration of t1 to t2, in a state where the lower switches SW1L and SW2L are turned on and the upper switches SW1H and SW2H are turned off, when the lower switch SW1L is switched to be turned off, the node voltage V1 gently increases due to LC resonance. Thus, when the upper switch SW1H is turned on at a timing at which the node voltage V1 is equal to the input voltage Vi (that is, at a timing at which a voltage across the upper switch SW1H is 0 V), the soft switching operation (ZVS operation) may be realized.

Further, as illustrated in the time duration of t3 to t4, in a state where the upper switches SW1H and SW2H are turned on and the lower switches SW1L and SW2L are turned off, when the upper switch SW1H is switched to be turned off, the node voltage V1 gently decreases due to LC resonance. Thus, when the lower switch SW1L is turned on at a timing at which the node voltage V1 is equal to the ground voltage GND1 (that is, at a timing at which a voltage across the lower switch SW1L is 0 V), the soft switching operation (ZVS operation) may be realized.

Also, as illustrated in the time duration of t5 to t6, in a state where the upper switch SW1H and the lower switch SW2L are turned on and the upper switch SW2H and the lower switch SW1L are turned off, when the lower switch SW2L is switched to be turned off, the node voltage V2 gently increases due to LC resonance. Thus, when the upper switch SW2H is turned on at a timing at which the node voltage V2 is equal to the input voltage Vi (that is, at a timing at which a voltage across the upper switch SW2H is 0 V), the soft switching operation (ZVS operation) may be realized.

Also, as illustrated in the time duration of t7 to t8, in a state where the upper switch SW2H and the lower switch SW1L are turned on and the upper switch SW1H and the lower switch SW2L are turned off, when the upper switch SW2H is switched to be turned off, the node voltage V2 gently decreases due to LC resonance. Thus, when the lower switch SW2L is turned on at a timing at which the node voltage V2 is equal to the ground voltage GND1 (that is, at a timing at which a voltage across the lower switch SW2L is 0 V), the soft switching operation (ZVS operation) may be realized.

Further, like patterns (b) of the node voltages V1 and V2, in a case in which the simultaneous OFF time Td of the upper switch and the lower switch is equal to an optimal value that satisfies the timing condition, an ideal soft switching operation (ZVS operation) may be realized, dramatically reducing switching loss and switching noise.

However, like patterns (a) of the node voltages V1 and V2, in a case in which the simultaneous OFF time Td is shorter than the optimal value, the simultaneous OFF time Td expires before the node voltages V1 and V2 increase to the input voltage Vi or before the node voltages V1 and V2 decrease to the ground voltage GND1.

Also, like patterns (c) of the node voltages V1 and V2, in a case in which the simultaneous OFF time Td is longer than the optimal value, the simultaneous OFF time Td expires after the node voltages V1 and V2 increase to the input voltage Vi and turn to decrease or after the node voltages V1 and V2 decrease to the ground voltage GND1 and turn to increase.

Thus, when the simultaneous OFF time Td is not identical to the optimal value, since the switch having a potential difference between both ends thereof is turned on, the effect of reducing switching loss and switching noise is damaged, compared with the ideal case.

However, the optimal value of the simultaneous OFF time Td is varied due to a state of the load 2, a manufacturing deviation of the switching output circuit 20 or the like, rather than being uniformly determined. For example, when an output current Io flowing in the load 2 is great, a current flowing in the transformer TR1 is also increased in turn. Accordingly, a charge/discharge time of parasitic capacitances C1H and C1L and parasitic capacitances C2H and C2L is reduced, reducing the optimal value of the simultaneous OFF time Td. Conversely, when the output current Io is small, the current flowing in the transformer TR1 is also decreased in turn. Thus, since the charge/discharge time of the parasitic capacitances C1H and C1L and the parasitic capacitances C2H and C2L is increased, the optimal time of the simultaneous OFF time Td is increased.

Thus, in order to always perform an optimal soft switching operation (ZVS operation), the switch driving circuit 10 has a function of periodically updating the simultaneous OFF time Td prepared to soft-switch the upper switches SW1H and SW2H and the lower switches SW1L and SW2L of the switching output circuit 20. This will be described in more detail hereinafter.

<Input/Output Monitoring Operation>

FIGS. 3A, 3B, 3C, 3D, 3E, and 3F are block diagrams illustrating an example of an input/output monitoring operation required to optimize the simultaneous OFF time Td. The switch driving circuit 10 monitors an output power Po or an input power Pi of the switching output circuit 20 and optimizes the simultaneous OFF time Td depending on the monitoring result.

Figure 3A:
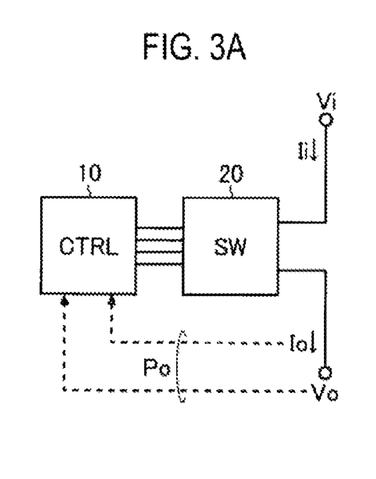
FIGS. 3A, 3B, 3C, 3D, 3E, and 3F are block diagrams illustrating an example of an input/output monitoring operation.
Figure 3B:
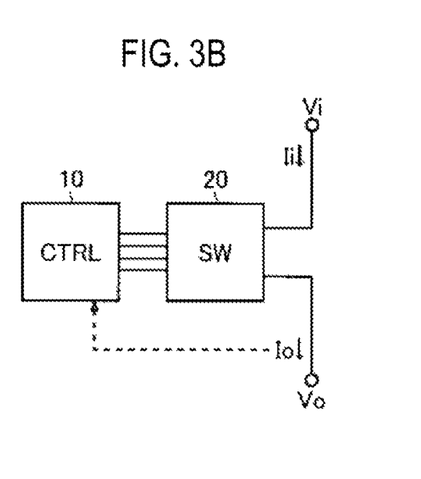
Figure 3C:
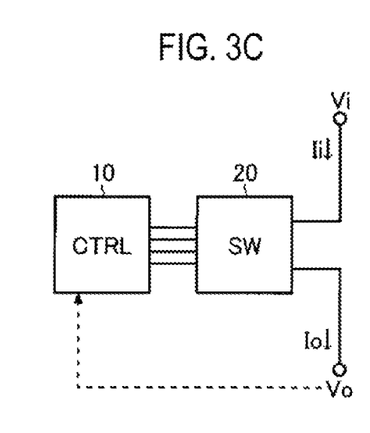

Further, in case of monitoring the output power Po, an output current Io and an output voltage Vo of the switching output circuit 20 may be individually monitored as illustrated in the column (FIG. 3A). However, when the output voltage Vo may be regarded as being constant, only the output current Io may be monitored as illustrated in the column (FIG. 3B). Also, when the output current Io may be regarded as being constant, only the output voltage Vo may be monitored as illustrated in the column (FIG. 3C).

Figure 3D:
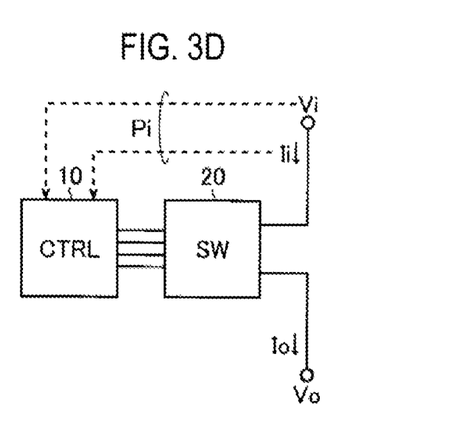
Figure 3E:
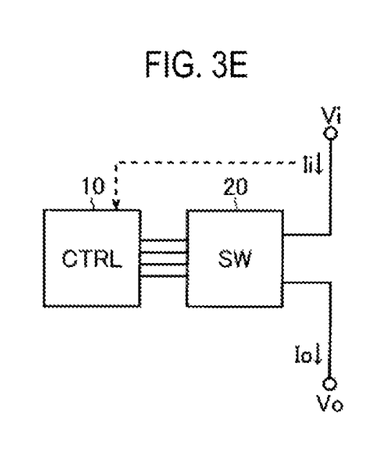
Figure 3F:
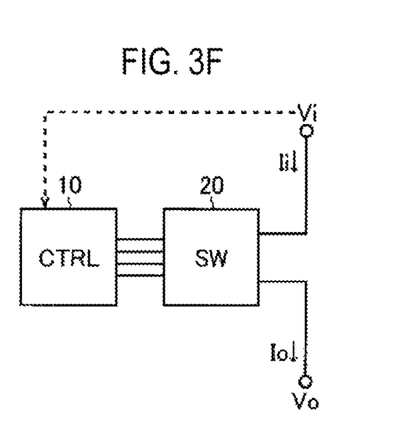

Meanwhile, in case of monitoring the input power Pi, an input current Ii and an input voltage Vi of the switching output circuit 20 may be individually monitored as illustrated in the column (FIG. 3D). However, when the input voltage Vi may be regarded as being constant, only the input current Ii may be monitored as illustrated in the column (FIG. 3E). Also, when the input current Ii may be regarded as being constant, only the input voltage Vi may be monitored as illustrated in the column (FIG. 3F).

That is, in optimizing the simultaneous OFF time Td, the switch driving circuit 10 may monitor at least one of the output current Io, the output voltage Vo, the input current Ii, and the input voltage Vi of the switching output circuit 20, as a monitoring target.

Hereinafter, the simultaneous OFF time updating operation that depends on the monitoring results will be described in detail by way of specific embodiments.

<Simultaneous OFF Time Updating Operation>

Figure 4:
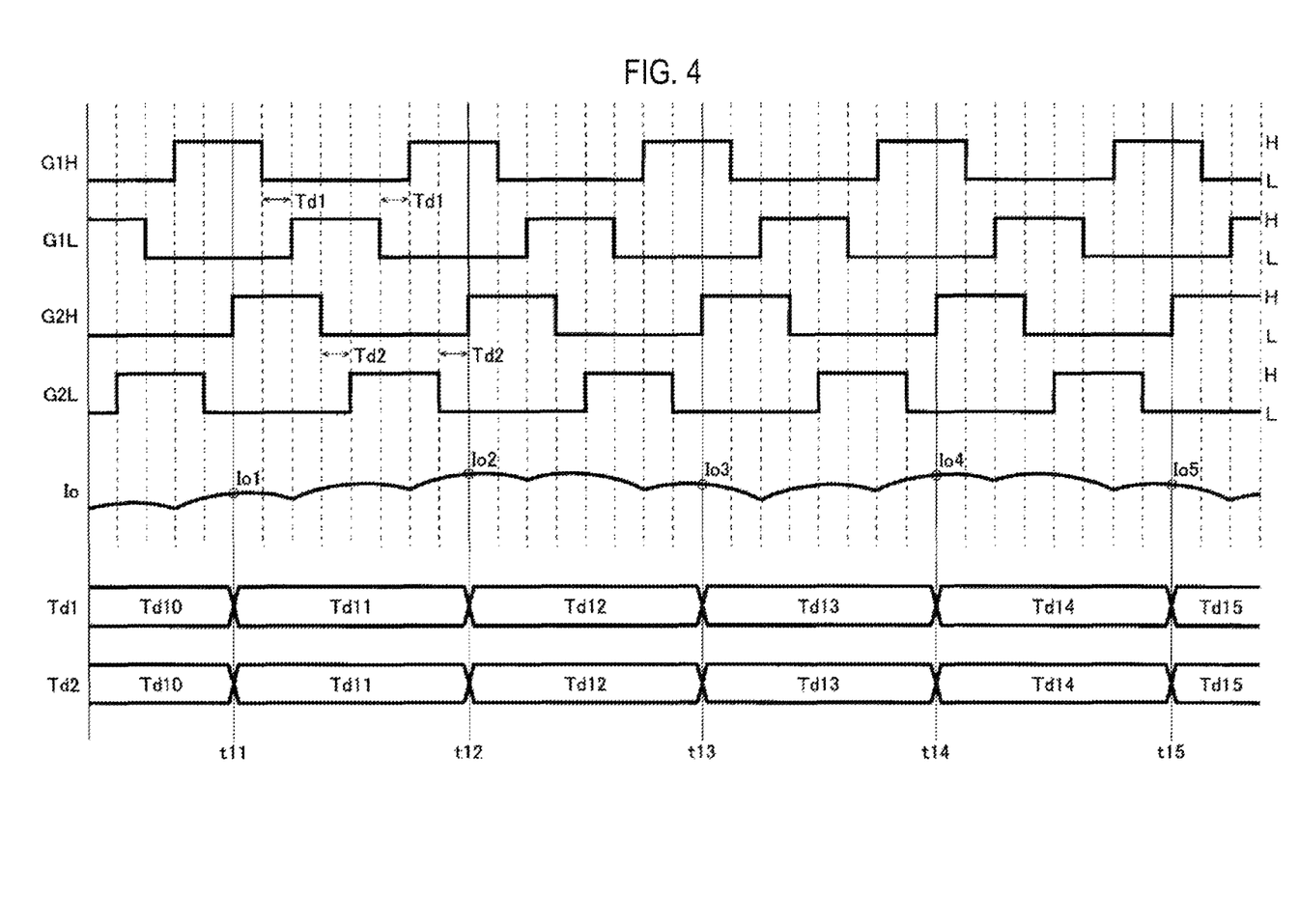
FIG. 4 is a timing chart illustrating a first example of a simultaneous OFF time updating operation.

FIG. 4 is a timing chart illustrating a first example of the simultaneous OFF time updating operation, in which the gate signals G1H, G1L, G2H, and G2L, the output current Io, a simultaneous OFF time Td1 of the upper switch SW1H and the lower switch SW1L and a simultaneous OFF time Td2 of the upper switch SW2H and the lower switch SW2L are illustrated sequentially from above. Further, in the following description, it may be regarded that the output voltage Vo is constant. Thus, the output power Po is increased as the output current Io is greater, and decreased as the output current Io is smaller.

In the operation of updating the simultaneous OFF times Td1 and Td2, the switch driving circuit 10 measures magnitudes ("Io1" to "Io5" in the exemplary drawing) of the output current Io at each timing of t11 to t15. Further, the switch driving circuit 10 monitors how the output current Io is changed depending on previous updating of the simultaneous OFF times Td1 and Td2 to determine new updated contents. Also, in the first example of the drawing, the magnitude of the output current Io is measured at every rising timing of the gate signal G2H arriving at a predetermined period, but the measurement timing is not limited thereto.

Hereinafter, a method for updating the simultaneous OFF times Td1 and Td2 based on a change behavior of the output current Io will be described in detail. In a case in which the output current Io is increased depending on previous updating of the simultaneous OFF times Td1 and Td2, the switch driving circuit 10 changes the simultaneous OFF times Td1 and Td2 in a direction of a change that is the same as that of the previous updating. Meanwhile, in a case in which the output current Io is decreased depending on previous updating of the simultaneous OFF times Td1 and Td2, the switch driving circuit 10 changes the simultaneous OFF times Td1 and Td2 in a direction of a change that is opposite to that of the previous updating.

As an example, a case in which, when the simultaneous OFF times Td1 and Td2 are prolonged from "Td10" to "Td11" at a time t11, the output current Io is increased from "Io1" to "Io2" by comparing the times t11 and t12 will be considered. In this case, since the efficiency of the switching output circuit 20 is increased due to the prolongation of the simultaneous OFF times Td1 and Td2, the switch driving circuit 10 further prolongs the simultaneous OFF times Td1 and Td2 from "Td11" to "Td12" at the time t12.

Next, a case when the simultaneous OFF times Td1 and Td2 are prolonged from "Td11" to "Td12" at time t12, the output current Io is decreased from "Io2" to "Io3" by comparing times t12 and t13 will be considered. In this case, since the efficiency of the switching output circuit 20 is decreased due to the prolongation of the simultaneous OFF times Td1 and Td2, the switch driving circuit 10 shortens the simultaneous OFF times Td1 and Td2 from "Td12" to "Td13" at the time t13.

Next, a case when the simultaneous OFF times Td1 and Td2 are shortened from "Td12" to "Td13" at time t13, the output current Io is increased from "Io3" to "Io4" by comparing times t13 and t14 will be considered. In this case, since the efficiency of the switching output circuit 20 is increased due to the shortening of the simultaneous OFF times Td1 and Td2, the switch driving circuit 10 further shortens the simultaneous OFF times Td1 and Td2 from "Td13" to "Td14" at the time t14.

Next, a case in which, when the simultaneous OFF times Td1 and Td2 are shortened from "Td13" to "Td14" at time t14, the output current Io is decreased from "Io4" to "Io5" by comparing times t14 and t15 will be considered. In this case, since the efficiency of the switching output circuit 20 is decreased due to the shortening of the simultaneous OFF times Td1 and Td2, the switch driving circuit 10 prolongs the simultaneous OFF times Td1 and Td2 from "Td14" to "Td15" at time t15.

Such a simultaneous OFF time updating operation allows for automatically optimizing the simultaneous OFF times Td1 and Td2 such that the efficiency of the switching output circuit 20 is always enhanced, without relying on a state of the load 2, a manufacturing deviation of the switching output circuit 20, or the like.

In addition, in the first example of the drawing, an example in which the output voltage Vo is regarded as being constant and only the output current Io being monitored is taken as an example, but as illustrated in FIGS. 3A, 3B, 3C, 3D, 3E and 3F, even when the output current Io is regarded as being constant and the output voltage Vo is monitored or even when the output power Po (both the output current Io and the output voltage Vo) is monitored, the simultaneous OFF times Td1 and Td2 may be updated such that the output power Po is as large as possible.

Meanwhile, in a case in which the input power Pi (or any one of the input current Ii and the input voltage Vi) is monitored, the simultaneous OFF times Td1 and Td2 need to be updated such that input power Pi is as low as possible. Thus, in the switch driving circuit 10, in a case in which the input power Pi is decreased depending on previous updating of the simultaneous OFF times Td1 and Td2, the simultaneous OFF times Td1 and Td2 may be changed in a direction of a change that is the same as that of the previous updating, and in a case in which the input power Pi is increased depending on previous updating of the simultaneous OFF times Td1 and Td2, the simultaneous OFF times Td1 and Td2 may be changed in a direction of a change that is opposite to that of the previous updating.

Further, in the first example of the drawing, the switch driving circuit 10 sets the simultaneous OFF time Td1 of the upper switch SW1H and the lower switch SW1L and the simultaneous OFF time Td2 of the upper switch SW2H and the lower switch SW2L to have the same length, and periodically updates each of those at the same timing. With this configuration, the switch driving circuit 10 can be simplified.

Figure 5:
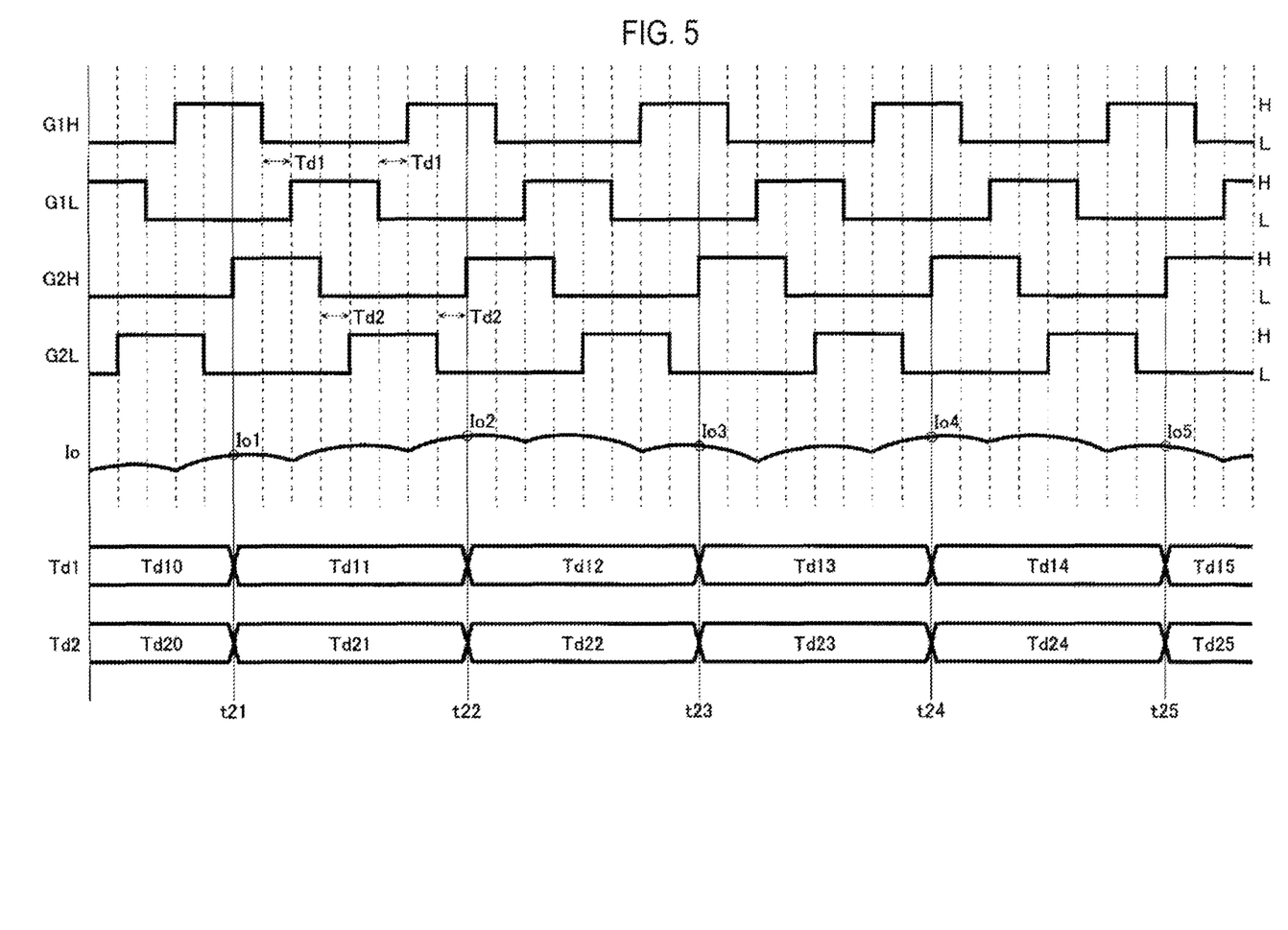
FIG. 5 is a timing chart illustrating a second example of the simultaneous OFF time updating operation.

FIG. 5 is a timing chart illustrating a second example of the simultaneous OFF time updating operation, in which the gate signals G1H, G1L, G2H, and G2L, the output current Io, and the simultaneous OFF times Td1 and Td2 are illustrated sequentially from above, like the foregoing case. In the second example of the drawing, the switch driving circuit 10 sets the simultaneous OFF times Td1 and Td2 to have different lengths, and periodically updates the simultaneous OFF times Td1 and Td2 at the same timing, unlike the first example.

For example, a case when the simultaneous OFF time Td1 is prolonged from "Td10" to "Td11" and the simultaneous OFF time Td2 is prolonged from "Td20" to "Td21" at a time t21, the output current Io is increased from "Io1" to "Io2" by comparing the times t21 and t22 will be considered. In this case, since the efficiency of the switching output circuit 20 is increased due to the prolongation of the simultaneous OFF times Td1 and Td2, the switch driving circuit 10 further prolongs the simultaneous OFF time Td1 from "Td11" to "Td12" and the simultaneous OFF time Td2 from "Td21" to "Td22" at the time t22.

Cases after time t22 are similar, and when the simultaneous OFF time Td1 is prolonged, the simultaneous OFF time Td2 is also prolonged at the same timing, and when the simultaneous OFF time Td2 is shortened, the simultaneous OFF time Td2 is also shortened at the same timing. However, each of the absolute values is not necessarily the same.

Figure 6:
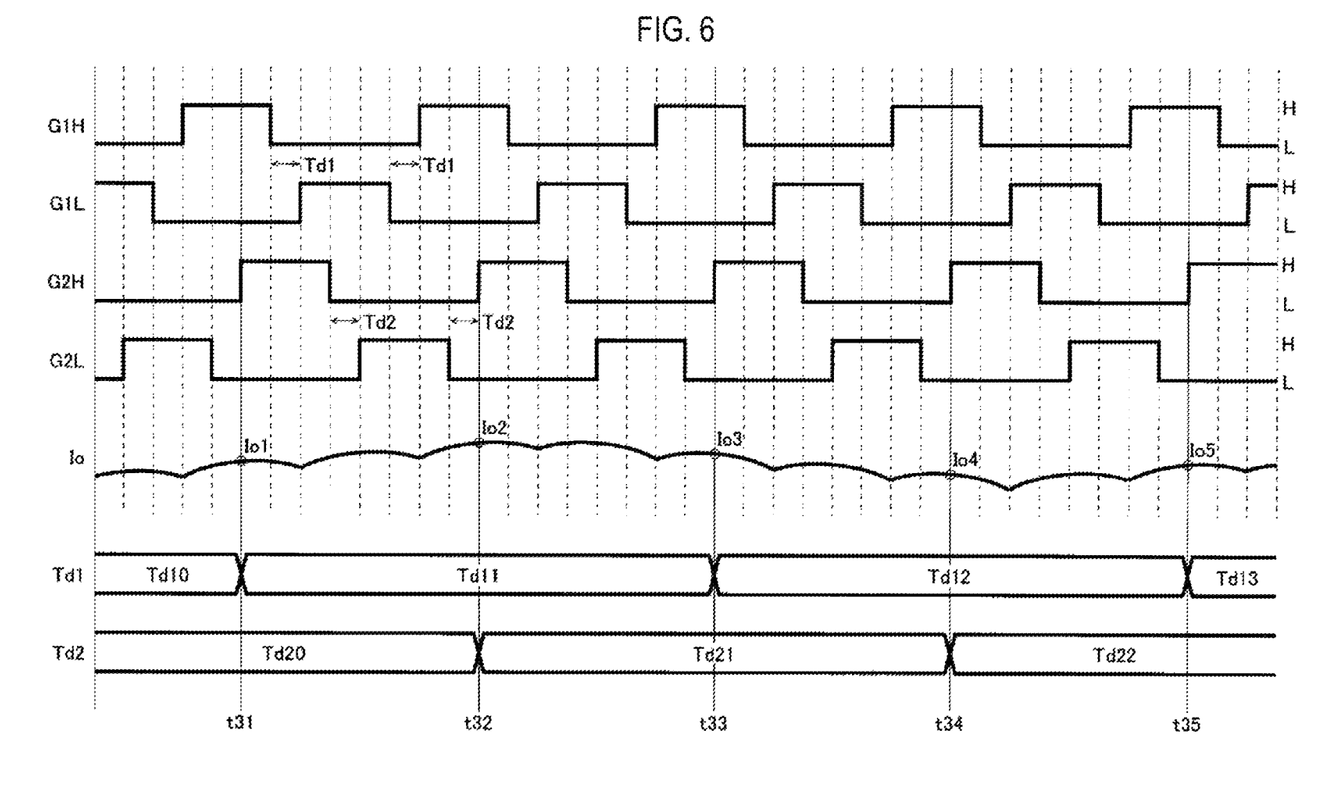
FIG. 6 is a timing chart illustrating a third example of the simultaneous OFF time updating operation.

FIG. 6 is a timing chart illustrating a third example of the simultaneous OFF time updating operation, in which the gate signals G1H, G1L, G2H, and G2L, the output current Io, and the simultaneous OFF times Td1 and Td2 are illustrated sequentially from top to bottom, like the foregoing case. In the third example of the drawing, the switch driving circuit 10 periodically updates the simultaneous OFF times Td1 and Td2 at different timings, unlike the second example.

Further, in the third example of the drawing, times t31, t33, and t35 are updating timings of the simultaneous OFF time Td1, and times t32 and t34 are updating timings of the simultaneous OFF time Td2. That is, the simultaneous OFF times Td1 and Td2 are alternately updated at different timings.

First, an operation of updating the simultaneous OFF time Td1 will be described. For example, a case in which, while fixing the simultaneous OFF time Td2 at time t31, when the simultaneous OFF time Td1 is prolonged from "Td10" to "Td11", the output current Io is increased from "Io1" to "Io2" by comparing times t31 and t32 will be considered. In this case, since the efficiency of the switching output circuit 20 is increased due to the prolongation of the simultaneous OFF time Td1, the switch driving circuit 10 further prolongs the simultaneous OFF time Td1 from "Td11" to "Td12" at time t33, while fixing the simultaneous OFF time Td2.

Further, a case in which, while fixing the simultaneous OFF time Td2 at time t33, when the simultaneous OFF time Td1 is prolonged from "Td11" to "Td12", the output current Io is decreased from "Io3" to "Io4" by comparing times t33 and t34 will be considered. In this case, since the efficiency of the switching output circuit 20 is decreased due to the prolongation of the simultaneous OFF time Td1, the switch driving circuit 10 shortens the simultaneous OFF time Td1 from "Td12" to "Td13" at the time t35, while fixing the simultaneous OFF time Td2.

Next, an operation of updating the simultaneous OFF time Td2 will be described. For example, a case in which, while fixing the simultaneous OFF time Td1 at time t32, when the simultaneous OFF time Td2 is prolonged from "Td20" to "Td21", the output current Io is decreased from "Io2" to "Io3" by comparing times t32 and t33 will be considered. In this case, since the efficiency of the switching output circuit 20 is decreased due to the prolongation of the simultaneous OFF time Td2, the switch driving circuit 10 shortens the simultaneous OFF time Td2 from "Td21" to "Td22" at time t34, while fixing the simultaneous OFF time Td1.

In this manner, when the simultaneous OFF times Td1 and Td2 are updated at different timings, the corresponding scheme may also be applied to a case in which the optimal values of the simultaneous OFF times Td1 and Td2 are different. Thus, a more optimal soft switching operation (ZVS operation) may be implemented to increase the effect of reducing switching loss and switching noise.

Figure 7:
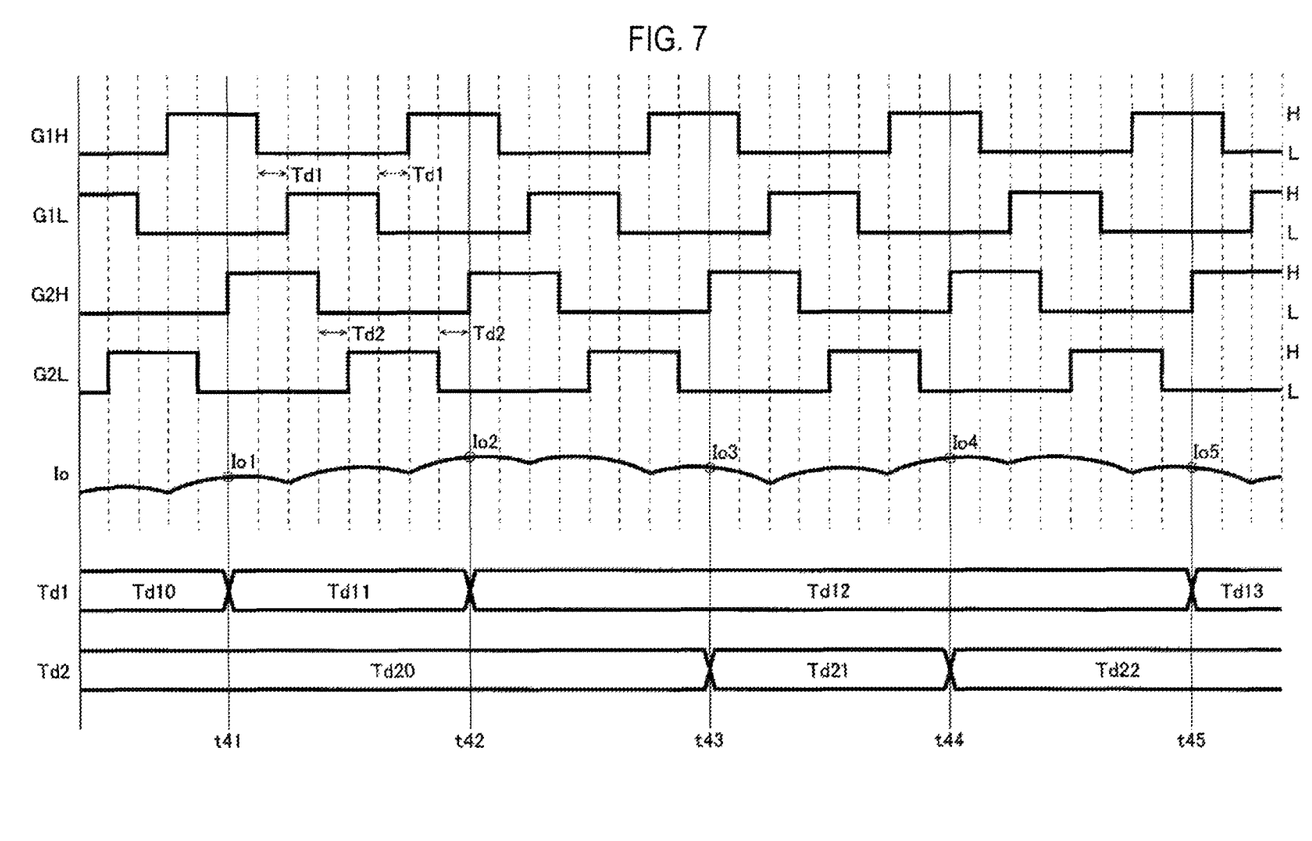
FIG. 7 is a timing chart illustrating a fourth example of the simultaneous OFF time updating operation.

FIG. 7 is a timing chart illustrating a fourth example of the simultaneous OFF time updating operation, in which the gate signals G1H, G1L, G2H, and G2L, the output current Io, and the simultaneous OFF times Td1 and Td2 are illustrated sequentially from top to bottom, like the foregoing cases. In the fourth example of the drawing, the switch driving circuit 10 continuously updates the simultaneous OFF times Td1 and Td2 at a plurality of periods, unlike the third example.

Further, in the fourth example of the drawing, times t41, t42, and t45 are updating timings of the simultaneous OFF time Td1, and times t43 and t44 are updating timings of the simultaneous OFF time Td2.

First, an operation of updating the simultaneous OFF time Td1 will be described. For example, a case in which, while fixing the simultaneous OFF time Td2 at the time t41, when the simultaneous OFF time Td1 is prolonged from "Td10" to "Td11", the output current Io is increased from "Io1" to "Io2" by comparing the times t41 and t42 will be considered. In this case, since the efficiency of the switching output circuit 20 is increased due to the prolongation of the simultaneous OFF time Td1, the switch driving circuit 10 further prolongs the simultaneous OFF time Td1 from "Td11" to "Td12" at the time t42, while fixing the simultaneous OFF time Td2.

Further, a case in which, while fixing the simultaneous OFF time Td2 at time t42, when the simultaneous OFF time Td1 is prolonged from "Td11" to "Td12", the output current Io is decreased from "Io2" to "Io3" by comparing times t42 and t43 will be considered. In this case, since the efficiency of the switching output circuit 20 is decreased due to the prolongation of the simultaneous OFF time Td1, the switch driving circuit 10 shortens the simultaneous OFF time Td1 from "Td12" to "Td13" at the time t45, while fixing the simultaneous OFF time Td2.

Next, an operation of updating the simultaneous OFF time Td2 will be described. For example, a case in which, while fixing the simultaneous OFF time Td1 at time t43, when the simultaneous OFF time Td2 is prolonged from "Td20" to "Td21", the output current Io is increased from "Io3" to "Io4" by comparing times t43 and t44 will be considered. In this case, since the efficiency of the switching output circuit 20 is increased due to the prolongation of the simultaneous OFF time Td2, the switch driving circuit 10 further prolongs the simultaneous OFF time Td2 from "Td21" to "Td22" at time t44, while fixing the simultaneous OFF time Td1.

Figure 8:
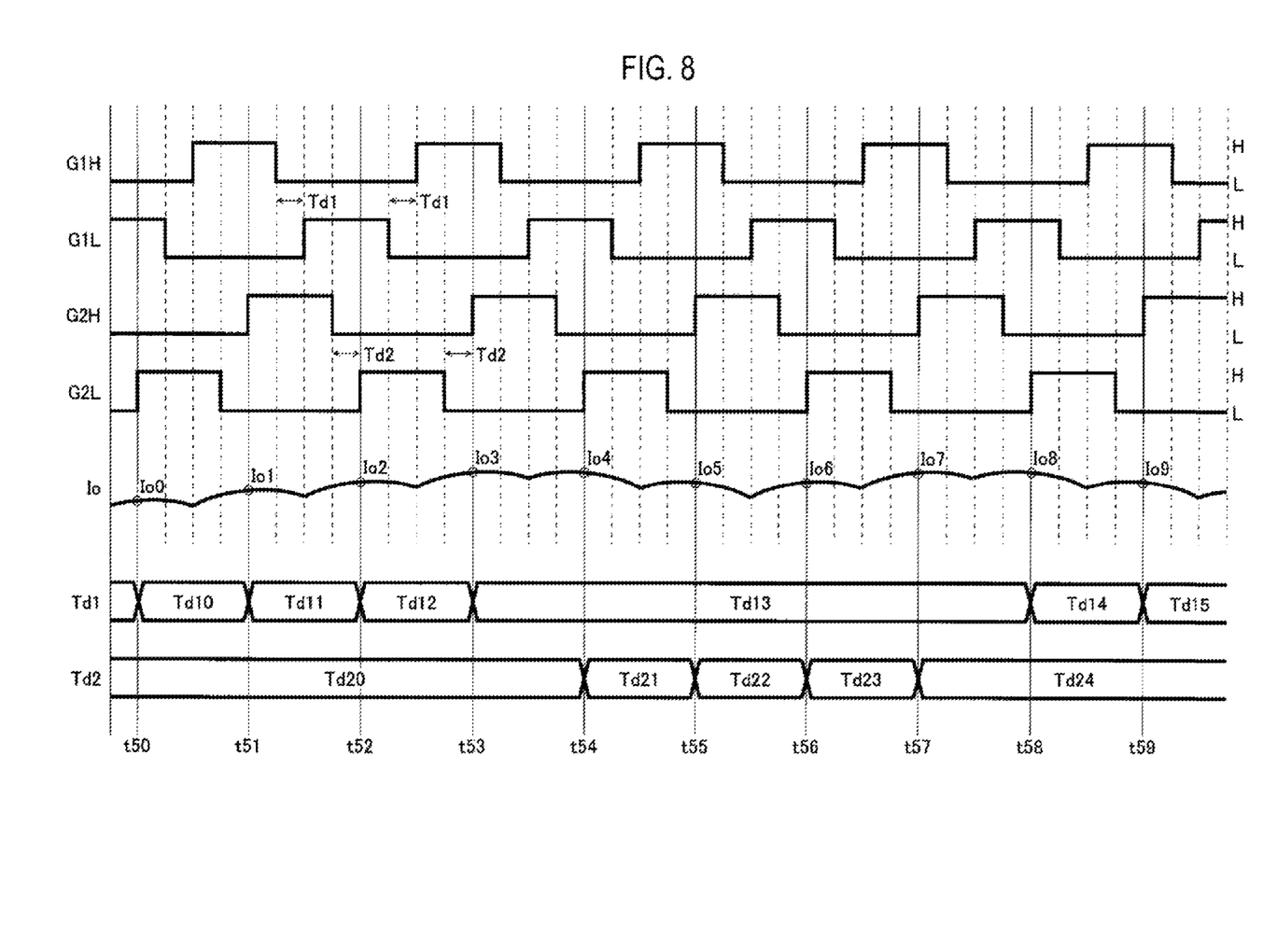
FIG. 8 is a timing chart illustrating a fifth example of the simultaneous OFF time updating operation.

FIG. 8 is a timing chart illustrating a fifth example of the simultaneous OFF time updating operation, in which the gate signals G1H, G1L, G2H, and G2L, the output current Io, and the simultaneous OFF times Td1 and Td2 are illustrated sequentially from top to bottom, like the foregoing cases. In the fifth example of the drawing, the switch driving circuit 10 sets updating periods of the simultaneous OFF times Td1 and Td2 to ½, unlike the fourth example. Specifically, the simultaneous OFF times Td1 and Td2 are updated even at a rising timing of the gate signal G2L, as well as at a rising timing of the gate signal G2H.

With this configuration, since the responsiveness to a fluctuation in the load 2 can be enhanced, a more optimal soft switching operation (ZVS operation) can be implemented to increase the effect of reducing switching loss and switching noise.

<Switch Driving Circuit>

Figure 9:
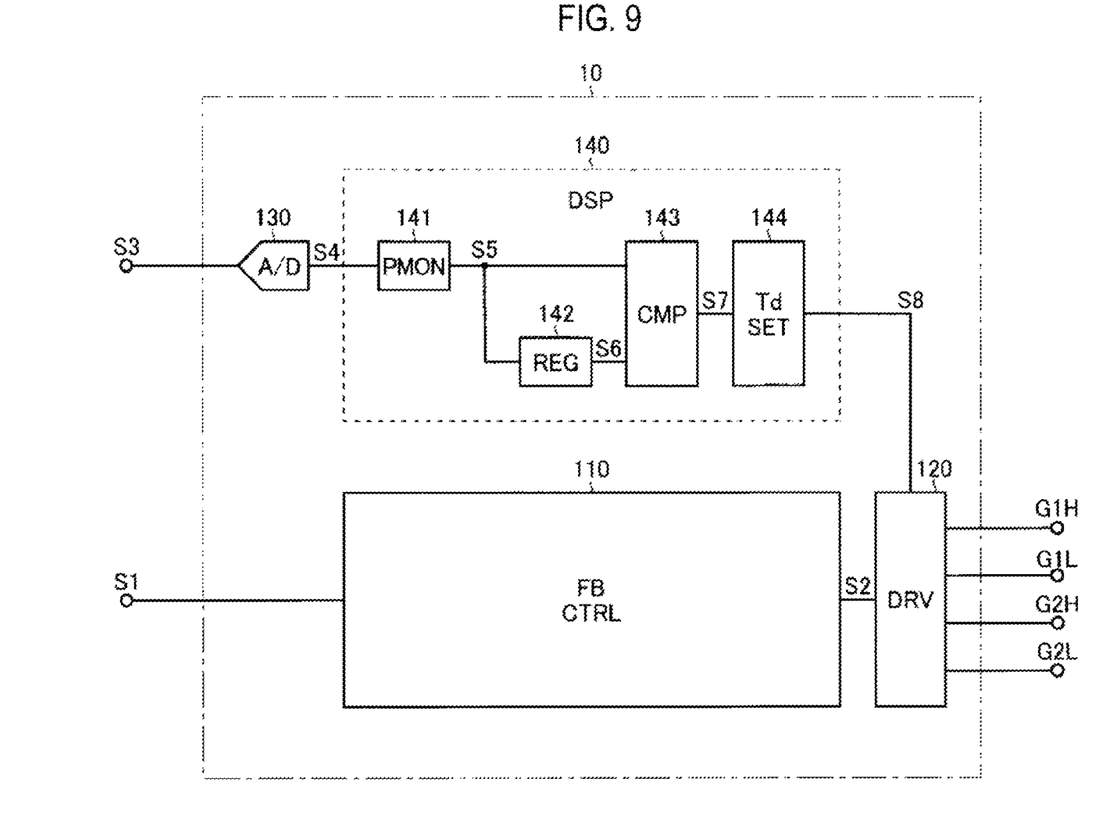
FIG. 9 is a block diagram illustrating a configuration example of a switch driving circuit 10.

FIG. 9 is a block diagram illustrating a configuration example of the switch driving circuit 10. The switch driving circuit 10 of this configuration example includes a feedback control part 110, a gate driving part 120, an analog/digital conversion part 130, and a digital signal processing part 140.

Upon receipt of a feedback signal S1 corresponding to the output voltage Vo, the feedback control part 110 generates a pulse signal S2 [a pulse width modulation (PWM) signal or a pulse frequency modulation (PFM) signal].

Upon receipt of the pulse signal S2, the gate driving part 120 generates gate signals G1H, G1L, G2H, and G2L for complementarily turning on and off the upper switches SW1H and SW2H and the lower switches SW1L and SW2L. In addition, the gate driving part 120 has a function of setting a simultaneous OFF time Td of the upper switches SW1H and SW2H and the lower switches SW1L and SW2L depending on a simultaneous OFF time setting signal S8. For example, as a data value of the simultaneous OFF time setting signal S8 is greater, the gate driving part 120 lengthens the simultaneous OFF time Td, and as the data value of the simultaneous OFF time setting signal S8 is smaller, the gate driving part 120 shortens the simultaneous OFF time Td.

The analog/digital conversion part 130 converts an analog monitoring signal S3 (at least one of an output current Io, an output voltage Vo, an input current Io, and an input voltage Vo) into a digital monitoring signal S4.

The digital signal processing part 140 monitors an output power Po or an input power Pi of the switching output circuit 20 and updates the simultaneous OFF time Td, and includes a power monitoring part 141, a storage part 142, a comparing part 143, and a simultaneous OFF time setting part 144.

The power monitoring part 141 samples/holds the digital monitoring signal S4 at an updating timing of a predetermined period (for example, see time duration of t11 to t15 illustrated in FIG. 4), and sequentially outputs the hold value as new data S5.

The storage part 142 stores the new data S5 input at a certain updating timing, and outputs the stored value as old data S6 at a next updating timing.

The comparing part 143 compares the new data S5 and the old data S6 to generate a comparison signal S7. For example, the comparison signal S7 has a high level when the output power Po is increased or when the input power Io is reduced depending on previous updating of the simultaneous OFF time Td, and conversely, has a low level when the output power Po is reduced or when the input power Io is increased depending on previous updating of the simultaneous OFF time Td.

The simultaneous OFF time setting part 144 updates the simultaneous OFF time setting signal S8 depending on the comparison signal S7. For example, when the comparison signal S7 has a high level at the present updating timing depending on a result of prolonging the simultaneous OFF time Td at a previous updating time, the simultaneous OFF time setting part 144 increases a data value of the simultaneous OFF time setting signal S8 such that the simultaneous OFF time Td may be additionally prolonged. Conversely, when the comparison signal S7 has a low level at the present updating timing depending on a result of prolonging the simultaneous OFF time Td at a previous updating time, the simultaneous OFF time setting part 144 decreases the data value of the simultaneous OFF time setting signal S8 such that the simultaneous OFF time Td may be reduced.

Further, when the comparison signal S7 has a high level at the present updating timing depending on a result of shortening the simultaneous OFF time Td at a previous updating time, the simultaneous OFF time setting part 144 decreases the data value of the simultaneous OFF time setting signal S8 such that the simultaneous OFF time Td may be further shortened. Conversely, when the comparison signal S7 has a low level at the present updating timing depending on a result of shortening the simultaneous OFF time Td at a previous updating timing, the simultaneous OFF time setting part 144 increases the data value of the simultaneous OFF time setting signal S8 such that the simultaneous OFF time Td may be prolonged.

OTHER EMBODIMENTS

In addition, various technical features disclosed in the present disclosure may be variously modified, without departing from the spirit of the present disclosure, in addition to the foregoing embodiments. That is, it should be considered that the foregoing embodiments are illustrative in every respect and not intended to be limited, and it should be understood that the technical scope of the present disclosure is not the description of the foregoing embodiments but defined by claims and is intended to encompass all the modifications that are within the meanings or scope equivalent to those claims.

According to the present disclosure in some embodiments, it is possible to provide a switch driving circuit capable of always performing an optimal soft switching operation (ZVS operation), and a switching power device using the same.

The present disclosure can be employed throughout the switching power device (particularly, a power source for vehicle to industrial equipment that requires a large power, and thus has industrial applicability.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A switch driving circuit for a power device comprising:
   a storage part configured to store an output power of a switching output circuit of the power device, the switching output circuit including:
      a transformer including an electronically coupled primary winding and secondary winding;
      an upper switch and a lower switch connected to the primary winding; and
      a rectifying part connected to the secondary winding and configured to generate the output voltage from an inductive voltage that appears in the secondary winding; and
   a controller configured to periodically update a simultaneous OFF time prepared to soft-switch the upper switch and the lower switch, and to monitor how the output power stored in the storage part is changed depending on previous updating of the simultaneous OFF time to determine a new simultaneous OFF time,
   wherein the controller is configured to:
      prolong the simultaneous OFF time to determine the new simultaneous OFF time in current updating, upon the output power being increased by prolonging the simultaneous OFF time in the previous updating;

shorten the simultaneous OFF time to determine the new simultaneous OFF time in the current updating, upon the output power being decreased by prolonging the simultaneous OFF time in the previous updating;

shorten the simultaneous OFF time to determine the new simultaneous OFF time in the current updating, upon the output power being increased by shortening the simultaneous OFF time in the previous updating; and prolong the simultaneous OFF time to determine the new simultaneous OFF time in the current updating, upon the output power being decreased by shortening the simultaneous OFF time in the previous updating.

2. The switch driving circuit of claim 1, wherein the switching output circuit is configured to generate an output voltage from an input voltage depending on an ON/OFF control of the upper switch and the lower switch.

3. The switch driving circuit of claim 2
wherein the upper switch includes a first upper switch and a second upper switch,
wherein the lower switch includes a first lower switch and a second lower switch,
wherein the first upper switch and the first lower switch are connected in series between an input terminal of the input voltage and a first ground terminal and a connection node between the first upper switch and the first lower switch is connected to a first terminal of the primary winding through an inductor, and
wherein the second upper switch and the second lower switch are connected in series between the input terminal of the input voltage and the first ground terminal and a connection node between the second upper switch and the second lower switch is connected to a second terminal of the primary winding.

4. The switch driving circuit of claim 3, wherein the rectifying part comprises:
a first rectifying diode, in which a cathode is connected to a first terminal of the secondary winding and an anode is connected to a second ground terminal;
a second rectifying diode, in which a cathode is connected to a second terminal of the secondary winding and an anode is connected to the second ground terminal;
a choke coil, in which a first terminal of the choke coil is connected to an intermediate tap of the secondary winding and a second terminal of the choke coil is connected to an output terminal of the output voltage; and
a smoothing capacitor, in which a first terminal of the smoothing capacitor is connected to the output terminal of the output voltage and a second terminal of the smoothing capacitor is connected to the second ground terminal.

5. The switch driving circuit of claim 3, wherein the switch driving circuit is configured to periodically update a first simultaneous OFF time of the simultaneous OFF time for the first upper switch and the first lower switch and a second simultaneous OFF time of the simultaneous OFF time for the second upper switch and the second lower switch.

6. The switch driving circuit of claim 5, wherein the switch driving circuit is configured to set the first simultaneous OFF time and the second simultaneous OFF time to have different lengths.

7. The switch driving circuit of claim 6, wherein the switch driving circuit is configured to update the first simultaneous OFF time and the second simultaneous OFF time at different timings.

8. The switch driving circuit of claim 7, wherein the switch driving circuit is configured to continuously update the first simultaneous OFF time and the second simultaneous OFF time at a plurality of periods.

9. The switch driving circuit of claim 1, wherein the switch driving circuit is configured to monitor an output current of the switching output circuit to calculate the output power.

10. The switch driving circuit of claim 1, wherein the switch driving circuit is configured to monitor an output voltage of the switching output circuit to calculate the output power.

11. The switch driving circuit of claim 1, wherein the switch driving circuit is configured to monitor both an output current and an output voltage of the switching output circuit to calculate the output power.

12. A switch driving circuit for a power device, comprising:
a storage part configured to store an input power of a switching output circuit of the power device, the switching output circuit including:
a transformer including an electronically coupled primary winding and secondary winding;
an upper switch and a lower switch connected to the primary winding; and
a rectifying part connected to the secondary winding and configured to generate the output voltage from an inductive voltage that appears in the secondary winding; and
a controller configured to periodically update a simultaneous OFF time prepared to soft-switch the upper switch and the lower switch, and to monitor how the input power stored in the storage part is changed depending on previous updating of the simultaneous OFF time to determine a new simultaneous OFF time,
wherein the controller is configured to:
prolong the simultaneous OFF time in current updating, upon the input power being decreased by prolonging the simultaneous OFF time in the previous updating;
shorten the simultaneous OFF time in the current updating, upon the input power being increased by prolonging the simultaneous OFF time in the previous updating;
shorten the simultaneous OFF time in the current updating, upon the input power being decreased by shortening the simultaneous OFF time in the previous updating; and
prolong the simultaneous OFF time in the current updating, upon the input power being increased by shortening the simultaneous OFF time in the previous updating.

13. The switch driving circuit of claim 12, wherein the switching output circuit is configured to generate an output voltage from an input voltage depending on an ON/OFF control of the upper switch and the lower switch.

14. The switch driving circuit of claim 13,
wherein the upper switch includes a first upper switch and a second upper switch,
wherein the lower switch includes a first lower switch and a second lower switch,
wherein the first upper switch and the first lower switch are connected in series between an input terminal of the input voltage and a first ground terminal and a connection node between the first upper switch and the first lower switch is connected to a first terminal of the primary winding through an inductor, and wherein the second upper switch and the second lower switch are connected in series between the input terminal of the input voltage and the first ground terminal and a connection node between the second upper switch and the second lower switch is connected to a second terminal of the primary winding.

15. The switch driving circuit of claim 14, wherein the rectifying part comprises:
a first rectifying diode, in which a cathode is connected to a first terminal of the secondary winding and an anode is connected to a second ground terminal;
a second rectifying diode, in which a cathode is connected to a second terminal of the secondary winding and an anode is connected to the second ground terminal;
a choke coil, in which a first terminal of the choke coil is connected to an intermediate tap of the secondary winding and a second terminal of the choke coil is connected to an output terminal of the output voltage; and
a smoothing capacitor, in which a first terminal of the smoothing capacitor is connected to the output terminal of the output voltage and a second terminal of the smoothing capacitor is connected to the second ground terminal.

16. The switch driving circuit of claim 14, wherein the switch driving circuit is configured to periodically update a first simultaneous OFF time of the simultaneous OFF time for the first upper switch and the first lower switch and a second simultaneous OFF time of the simultaneous OFF time for the second upper switch and the second lower switch.

17. The switch driving circuit of claim 16, wherein the switch driving circuit is configured to set the first simultaneous OFF time and the second simultaneous OFF time to have different lengths.

18. The switch driving circuit of claim 17, wherein the switch driving circuit is configured to update the first simultaneous OFF time and the second simultaneous OFF time at different timings.

19. The switch driving circuit of claim 18, wherein the switch driving circuit is configured to continuously update the first simultaneous OFF time and the second simultaneous OFF time at a plurality of periods.

20. The switch driving circuit of claim 12, wherein the switch driving circuit is configured to monitor an input current of the switching output circuit to calculate the input power.

21. The switch driving circuit of claim 12, wherein the switch driving circuit is configured to monitor an input voltage of the switching output circuit to calculate the input power.

22. The switch driving circuit of claim 12, wherein the switch driving circuit is configured to monitor both an input current and an input voltage of the switching output circuit to calculate the input power.

* * * * *